(12) United States Patent
Bhowmick et al.

(10) Patent No.: US 6,435,041 B1
(45) Date of Patent: Aug. 20, 2002

(54) DEVICE USEFUL FOR MEASURING THE FLOW RATE OF CRYOGENIC LIQUIDS FLOWING THROUGH A TUBE

(75) Inventors: Bimal Chandra Bhowmick; Amal Kumar Dutta; Santosh Kumar Ray; Nageshwar Sahay; Lakshmi Kanta Bandyopadhyay; Sri Mohan Verma; Ishtiaque Ahmad; Tribhuwan Nath Singh, all of Bihar (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 09/382,927

(22) Filed: Aug. 25, 1999

(30) Foreign Application Priority Data

Aug. 26, 1998 (IN) ........................................ 2525/DEL/98

(51) Int. Cl.$^7$ ................................................. G01F 1/28
(52) U.S. Cl. ................................................... 73/861.74
(58) Field of Search ......................... 73/861.74, 861.04, 73/304, 861.71

(56) References Cited

U.S. PATENT DOCUMENTS

| | | | |
|---|---|---|---|
| 4,027,534 A | * 6/1977 | Zimmermann | 73/304 |
| 5,890,515 A | * 4/1999 | Spiess et al. | 137/552 |
| 6,119,724 A | * 9/2000 | Cazzaniga | 137/552 |
| 6,186,049 B1 | * 2/2001 | Stoll et al. | 92/88 |

* cited by examiner

Primary Examiner—Benjamin R. Fuller
Assistant Examiner—Jewel V. Thompson
(74) Attorney, Agent, or Firm—Ladas & Parry

(57) ABSTRACT

The present invention relates to a device useful for measuring the flow rate of cryogenic liquids flowing through a tube, which comprises two coaxial tubes integrated at both ends by means such as plugs, the space between the coaxial tubes being air-free and filled with insulating material, the said coaxial tubes being provided at the bottom walls with a segmental opening with sealed ends in such a manner so as to accommodate a closed ended hollow cylinder having a matching inner surface profile as that of inner surface of the said tube, the outer surface of the said hollow cylinder having insulating block fixed onto it one end of a conducting strip, the strip being rotatably fixed at its middle portion by means such as a hinge, support and fixed frame in such a manner that the inner surface of the cylinder flushes with the inner wall of the tube and allows lateral movement of the said cylinder due to drag force of cryogenic liquid flow, the said frame having two insulators fixed onto it to support a stretched potentiometer wire in such a manner that the said wire and the free end of the said conducting strip are in contact to form the junction of two arms of a whetstone bridge, the conducting strip being provided between the hinged point and potentiometer wire contact end with a coaxial coil, one end of the coil being connected through a slackening wire to one end of another coaxial coil insulating block fixed onto the said frame, the frame, strip, wire, coil being enclosed in a dual walled jacketed and insulated casing in such a manner as to allow electrical connection to be taken out from the two ends of potentiometer wire, hinged portion of the conducting strip and the free ends of the coaxial coils and connected to a whetstone bridge and a microprocessor unit respectively.

8 Claims, 2 Drawing Sheets

DEVICE USEFUL FOR MEASURING THE FLOW RATE OF CRYOGENIC LIQUIDS FLOWING THROUGH A TUBE

FIELD OF INVENTION

This invention relates to a device useful for measuring the flow rate of cryogenic liquids flowing through a tube. The present invention particularly relates to a device useful as a flow meter for measurement of flow rate of liquid nitrogen ($LN_2$) or any other cryogenic liquid through tubes without offering any additional resistance to the flow.

BACKGROUND AND PRIOR ART DETAILS OF THE INVENTION

Large amount of liquid nitrogen is now a days routinely infused in coal mines through bore holes for control of fire. For this purpose, the cryogenic liquid from tankers is flushed to underground mines direct through bore holes or through super insulated tubes laid along bore holes. For best results, it is imperative that flow of $LN_2$ be measured accurately.

However, presently the following practices are being adopted for measuring flow rate of liquid nitrogen to control fire in underground mines:

Conventionally, the level different of $LN_2$ in a tanker is measured with the help of a meter which is suitably calibrated. This level difference serves as an indicator for measuring flow rate of inlet cryogenic liquid flushed. If there is any leakage in the tanker, flow of cryogenic liquid can not be measured accurately by this process. Further, if $LN_2$ or any other cryogenic liquid is flushed through two or more bore holes simultaneously flow through individual bore holes can not be measured.

The known flow meters using orifice principle, Venturi meter, Rotameter, the flow meter using vortex principle are not well suited for measurement of flow rate of cryogenic liquid because of typical cryogenic properties of the liquid. Further, they always offer some amount of resistance to the flow being measured. Thus, a number of flow meters based on different principles are available for measurement of flow rate of cryogenic liquid. Various types of flow meters along with their basic principle are discussed below:

Orifice meter

The orifice meter consists of a thin plate (1.6 mm to 3.2 mm) with a sharp-edged hole in the centre of the plate. For ensuring a symmetrical velocity distribution upstream of the meter, a length of straight line of at least ten times the tube diameter should be placed upstream of the orifice and a length of line about five times the tube diameter should be placed downstream of the meter (Barron, 1985). For liquid mass flow rate measurement the equation for the orifice meter is $$m = C_d C_a A_0 (2 g_0 \rho \Delta P)^{0.5}$$

Where $C_d$=discharge coefficient
$C_0$=velocity-of approach coefficient
$A_0$=area of orifice
$\rho$=fluid density
$\Delta P$=pressure drop across the orifice.

The calibration curve obtained by using water as the flowing fluid can be applied directly to the measurement of flow of liquid hydrogen, liquid nitrogen and liquid oxygen with ±percent accuracy as long as the fluid is single phase upstream of the meter.

Venturi meter

In order to welcome the problem like large frictional and turbulent energy dissipation as happened when fluid flows through the orifice, this meter is often being preferred as a flow measuring element. The Venturi meter consists of a conical reducer section and a straight throat section, followed by a more gradual enlargement to the original tube diameter. The inlet cone angle is usually 20° to 22° and the exit cone angle is about 5° to 7°. The throat diameter is of the order of one-half the tube diameter. Pressure taps are placed about one-half tube diameter upstream of the venturi entrance and at the centre of the throat section (Barron, 1985). The volumetric flow rate may be determined using the equation same as that of the Orifice meter.

Turbine flow meter

Flow rate is measured by measurement of the rotational speed of a freely spinning turbine wheel placed in the centre of the flowing stream. Each time a turbine blade passes the face of the permanent magnet which is placed in the body.

The change in the permeability of the magnetic circuit produces a voltage pulse at the output terminal. The frequency of these pulses is directly proportional to rotational speed of the turbine wheel. The pulse rate may be indicated by a Frequency meter, displayed on a cathode-ray oscilloscope screen or counted by an EPUT (events per unit time) meter.

At high Reynolds number (about 6000) the volumetric flow rate is related to rotational speed of turbine n by (Hochreiter, 1958).

$$V = \pi D_b A_{ff} \cdot n / \tan 0_b = Kn$$

Where $D_b$=rotor blade tip diameter
$0_b$=angle between the blade and the meter centre line
$A_{ff}$=free-flow area through the turbine Kent Vortex Meter:

This flow meter works on eddy-shedding principle (Ower, E & Pankhurst, R. C., 1977). The eddies are generated by a sharp-edged cylinder of rectangular cross section, which produces a better-defined eddy pattern than a circular cylinder.

Difference between an Orifice meter as compared to proposed invention:

To ensure symmetrical velocity distribution upstream of the meter, a length of straight line at least ten times the tube diameter should be maintained upstream of the orifice and a length of straight line at least five times the tube diameter be maintained downstream of the meter. This is sometimes not possible while dealing with cryogenic fluids in underground. This is used when trouble free installations is essential.

Further, in the orifice meter a few components create resistance to the flow of the liquid. However, the present device, no obstruction is introduced in the flow path therefore, it is capable of functioning and deliver accurate result without the above restrictions.

In addition, the orifice meter produces a relatively large permanent pressure drop which is undesirable when measuring flows of cryogenic fluids under saturation condition (Barron, 1985) whereas no such pressure drop exists in the proposed device.

As regards Venturi meter, it suffers from problem o cavitation (Purcell et al 1960). To avoid the problem of cavitation, it is necessary to maintain the upstream pressure high enough so that the vapor pressure is not reached at the throat of the Venturi. Whereas the present invention, the flow of liquid is not disturbed in any way, therefore, the question of cavitation does not arise.

In case of a turbine flow meter, a turbine wheel is placed in the centre of the meter body itself it may cause obstruction to the flow of liquid. The proposed system does not introduced any resistance to the flow of liquid being measured.

The second problem in case of a turbine flow meter is that it must be protected during cool down of a cryogenic fluid transfer line in which the meter is placed because severe flow oscillations and surges may destroy the meter (Steward 1965), whereas no such problem is envisaged in the proposed device.

As regards, Kent Vortex Meter, the accuracy of the instrument deteriorates at lower Reynolds number (Ower, E & Pankhurst, R. C., 1977). However, no such problem is identified in the proposed device.

Further, the pressure loss across the meter is two velocity heads in a Kent Vortex meter whereas, in the proposed device, there is not obstruction in the flow path, the pressure loss is the normal pressure loss n the pipe due to friction.

Apart from the above known devices, there are two U.S. Pat. Nos. 5,765,602 dated Jun. 16, 1998 and 3,958,443 dated May 25, 1976 relating to metering and transfer of cryogenic liquid and apparatus for providing and calibrating cryogenic flow meters respectively. These two devices do not envisage the present invention.

The main object of the present invention is to a provide a device useful for measuring the flow rate of inert cryogenic liquids flowing through a tube.

Another object of the present invention is to provide a device for measuring flow rate of inert cryogenic liquid precisely as the rate of injection as well as the total amount of $LN_2$ injected in an underground fire area are two very important parameters for quick control of fire and optimization of use of $LN_2$.

Yet another object of the present invention is to measure the flow rate without hindering/offering additional resistance to the flow of inert cryogenic liquid.

DETAILED DESCRIPTION OF THE INVENTION

Accordingly, the present invention provides a device useful measuring the flow rate of cryogenic liquids flowing through a tube, which comprises two coaxial tubes integrated at both ends by plug means, the space between the coaxial tubes being air-free and filed with insulating material; the said coaxial tubes being provided at the bottom walls with a segmental opening with sealed ends in such a manner so as to accommodate a closed end hollow cylinder having a matching inner surface profile as that of inner surface of the said tube, the outer surface of the said hollow cylinder having insulating block fixed onto it one end of a conducting strip, the strip being rotatably fixed at its middle portion by means such as a hinge, support and fixed frame in such a manner that the inner surface of the cylinder flushes with the inner wall of the tube and allows lateral movement of the said cylinder due to drag force of cryogenic liquid flow, the said frame having two insulators fixed onto it to support a stretched potentiometer wire in such a manner that the said wire and the free end of the said conducting strip are contact to form the junction of two arms of a whetstone bridge, the conducting strip being provided between the hinged point and potentiometer wire contact end with a coaxial coil, one end of the coil being connected through a slackening wire to one end of another coaxial coil insulating block fixed onto the said frame, the frame, strip, wire, coils being enclosed in a dual walled jacketed and insulated casing in such a manner as to allow electrical connections to be taken out from the two ends of potentiometer wire, hinged portion of the conducting strip and the free ends of the coaxial coils or connected to a wheatstone bridge and a microprocessor unit respectively.

In an embodiment of the device of the present invention, the overall density of the set-up consisting of the hollow cylinder, conducting strip and attached coaxial coil is almost same as that of the cryogenic liquid, the flow rate of which is to be measured.

In another embodiment, the current flow through the two coaxial coils used is in opposite direction to one another.

In yet another embodiment, the microprocessor unit used comprises an Analogue to Digital Converter (ADC) port, Digital to Analogue Converter (DAC) port, plurality of memory locations and display unit interface.

The following basic principles have been used in the device of the present invention to measure rate of flow of $LN_2$ flushed through tubes laid along a bore hole intersecting an opening below ground to control fire.

When cryogenic liquids such as liquid nitrogen is passed through a pipe it exerts a Drag Force at the wall of the pipe along the direction of flow. This Drag Force is proportional to the square of the velocity of the fluid, roughness of the pipe wall, density and viscosity of the fluid. For a particular fluid and pipe system all the parameters are constant, only velocity changes with the quantity of flow. Therefore, force on a small segment of the pipe wall is proportional to square of the velocity and hence square of flow rate of the liquid. In fact, a detailed experimentation has lead to the following well established empirical relation.

$$\tau = 0.034 \, \rho U_m^2 (v/Ur)^{0.25} \tag{1}$$

where $\tau$ is the drag stress on pipe wall, N m$^{-2}$ $\rho$ is the density of the fluid, Kg/m$^3$ $v$ is the viscosity, m$^2$/sec $U_m$ is the velocity of the fluid in the pipe, m/sec $r$ is the radius of the pipe, m.

The flow criterion in the pipe may be regarded as a boundary layer on a flat plate which has been wrapped round an axis at a distance $\delta$ from the plate equal to radius r of the pipe. The axial velocity $U_m$ is equivalent to the undisturbed stream velocity U of the flat surface boundary layer. The drag force is the product of $\tau$ and the surface area of the walls over the length $\delta x$, that is $\tau P \delta x$ where P is the perimeter of the pipe. Therefore, drag force is proportional to the square of velocity of fluid flow and hence proportional to square of the volume flow rate.

However, for the volume flow rate of our interest and pipe diameter normally used in infusion of $LN_2$ in mines the drag force would be small, and therefore for accurate measurement of the volume flow rate the system must have a device to measure small force accurately. This is embodied as the device of the present invention in the following manner.

A small segment of the pipe wall is cut, removed and replaced by a hollow cylinder having its inner surface the same profile as that of the inner wall of the pipe. A thin metal strip is fixed at the centre of the outer surface of the hollow cylinder. The metal strip is hinged at around its middle portion such that inner surface of the cylinder flushes with inner wall of the pipe and the cylinder can easily move laterally due to drag force on it. The gap between the cylinder and the pipe is however kept small. The material of the hollow cylinder, the metal strip and the volume of the cylinder are so fixed that overall density of entire set-up is same as that of $L_2$. Therefore, when the system is immersed in LN$_2$ no downward or upward force is experienced by the set-up due to gravity or buoyancy. The free end of the metal strip smoothly slides on a potentiometer wire and its contact point forms the junction of two arms of a whetstone bridge. The other two arms of the bridge are so adjusted that when there is no flow of liquid through the pipe the contact point is at the middle of the potentiometer wire and a small amount of unbalanced voltage is available between the junctions of the bridge. This unbalanced voltage is fed to 'Analogue to Digital Converter' (ADC) pot of a microprocessor based unit and the converted digital data is stored in the memory location M$_1$ of the microprocessor unit. As the fluid flows through the pipe the hollow cylinder is dragged towards the direction of flow (say to the right) and the free end of the metal strip is pushed towards the opposite direction (say to the left), consequently the junction of the whetstone bridge changes, thereby changing the unbalanced voltage. The arrangement of the bridge is such that as the free end of the metal strip moves towards left the unbalanced voltage increases. The new unbalanced voltage becomes input to the ADC port and the corresponding digital value is stored in some other memory location. As the flow increases after certain interval of time the corresponding digital values of the unbalanced voltage are stored in successive memory locations. When the flow becomes steady the digital value is stored in memory location M$_2$. The processor then compares the value stored in memory locations M$_1$ and M$_2$. Depending upon the value difference stored in M$_1$ & M$_2$ the processor correspondingly gives an output analogue signal through the 'Digital to Analogue Converter' (DAC) port. This analogue voltage is fed as the input to two coaxial coils connected in series and arranged parallel to each other. One coil is fixed while the other is mounted on the metal strip attached to the hollow cylinder. Winding in the coils (are such that current flow through the coils) is in opposite direction to each other. It can be provided that under the aforesaid circumstances the force of repulsion, F between these two coils is approximately given by:

$$F = 1.5 \mu \pi, j_n i_b . a^2 b^2 x / (a^2 + x^2)^{3/2}$$

Where, x is the distance between the coils along their axis a, b are the radius of the coils $i_a$, $i_b$ are the current through the coils a & b respectively.

$\mu$ is the magnetic permeability of the medium.

In our case $i_a = i_b = i$, a & b are fixed and x is also constant for central position of the metal strip.

Therefore, $$F = ki^2 \quad (2)$$

where $$K = 1.5 \, \mu\pi . a^2 b^2 x / (a^2 + x^2)^{3/2}$$

For the equilibrium of the hollow cylinder $$A.\tau.l_1 = k.i^2.l_2 \quad (3)$$

where $l_1$ and $l_2$ are the distances of the cylinder and the coil from the hinge of the metal strip. A is the area of the cylinder surface exposed to the liquid flow.

Substituting the value of $\tau$ in equation (3) the above expression may be written as:

$$A[0.034 \, \rho U_m^2 (v/Ur)^{0.25}]l_1 = k.i^2.l_2$$

or, $$U_m^2 = K. \, I^2 \text{ where } K = k.l_2/A[0.034 \, \rho U_m^2(v/Ur)^{0.25}]l_1$$

or, $U_m$ is proportional to I

Since the volume flow of liquid through the pipe is proportional to velocity of the liquid, volume flow rate through the pipe is directly proportional to current flow through the coil. Thus if the output analogue voltage is adjusted so that flow of current through the set of coaxial coils increases till the repulsive force produced between them pushes the metal strip back to its initial central position. This is confirmed by the processor as it gets an input value same as stored in memory location M$_1$. At this point current through the coil ceases to increase and remains constant. Under the circumstances, the value of the current flowing through the coils becomes a measure of the applied force on the metal strip and hence the flow rate of the liquid. This value is calibrated and displayed in terms of flow rate liter/min.). When the flow starts decreasing and gradually stops the processor still supplies current to the coils. As a result the metal strip slides to the right direction and the input voltage to the microprocessor reduces and may become negative. When the input digital value becomes less than the value stored at M$_1$ or negative the processor reduces the output analogue voltage and less current flows through the coils indicating reduced flow through the tube. As the flow reduces further current through the coils also reduces. Finally, when flow reduces to zero and the microprocessor strops generating output analogue voltage, current through the coils is also zero.

Figure 1:
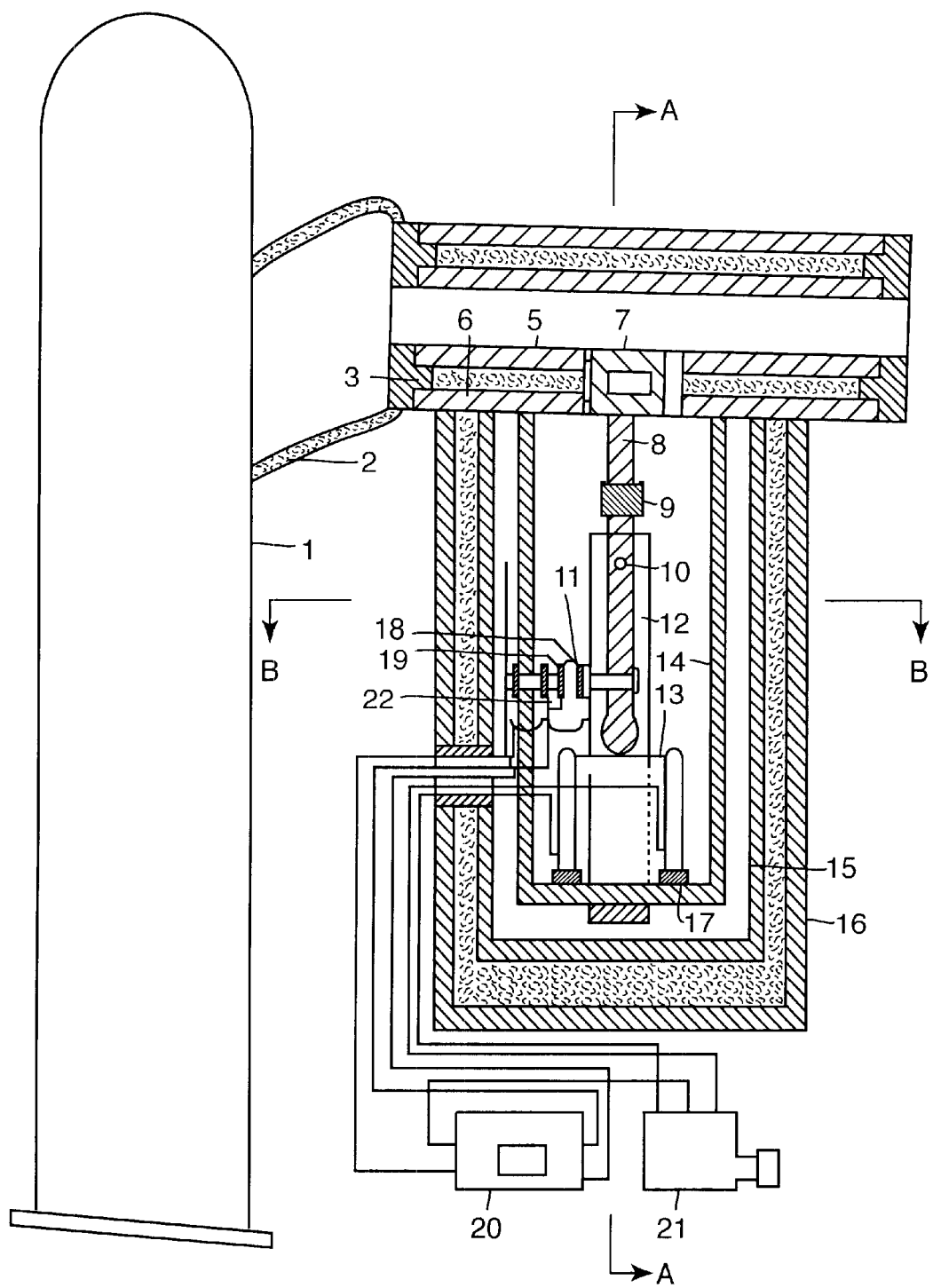
FIGS. 1, 2 & 3 of the drawings accompanying this specification shows the sectional elevation, sectional side view (at AA) and sectional plan (at BB) respectively of the device of the present invention.
Figure 2:
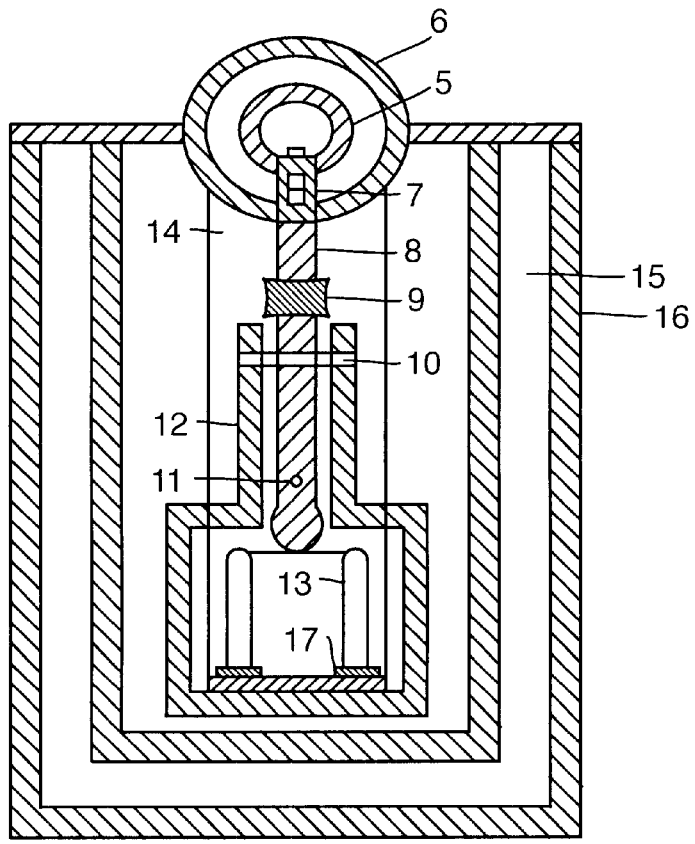
Figure 3:
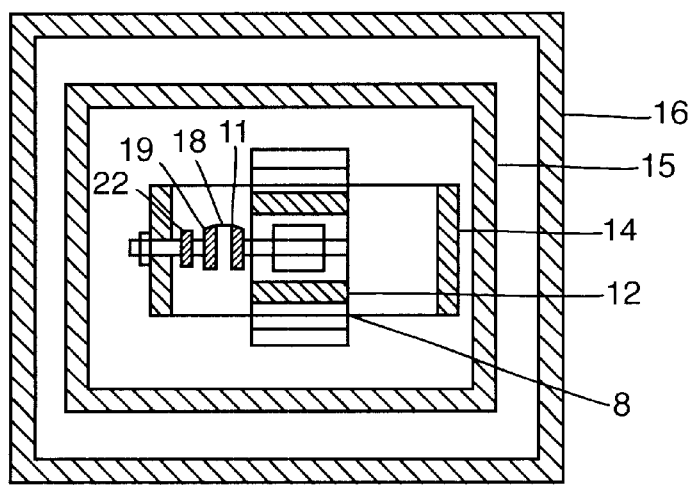

The device essentially consists of two coaxial tubes (5) & (6) integrated with plugs (3) & (4) at both the ends. A small segment at the bottom of the coaxial tubes (5) & (6) is cut, removed to accommodate a hollow cylinder (7). A metal strip (8) rounded off at the bottom is welded with the cylinder (7). The metal strip (8) hinged at (10) supported on a metal flat (12) is fitted with a coil (11) mounted at its lower portion. The lower portion of the metal strip (8) is electrically insulated from the upper portion by an insulator (9). The metal flat (12) is fitted in such a way that the metal strip being hinged at (10) can slide on a potentiometer wire (13) and its contact point forms the junction of two arms of a whetstone bridge (13) & (21). The metal flat (12) is supported on a frame (14), two ends of the frame (14) are welded with the tube (6). The horizontal segment of the frame (14) accommodates part of the whetstone bridge circuit (13). Potentiometer wire is mounted on two insulators (17) which is based on the frame (14). The bigger coil (19) is fixed at one side of the frame (14) but electrically insulated from it by an insulator (22) while the coil (11) moves with the metal strip (8) and a slackening wire (18) connects the coil (11) & (19). The whole system is enclosed in two parallel metal casing (15) & (16) maintaining an air free space between them which is filled up with insulating material. Two ends of the potentiometer wire (13) are connected with whetstone bridge (21) at the outside of the casing (15) & (16). Further, the two ends of the coils (19) & (11) and a connection from the hinge (10) of the metal strip (8) are brought out of the casing (15) & (16) and connected to the microprocessor unit (20).

The working of the device of the present invention for accurate measurement of flow of liquid nitrogen or other cryogenic liquid is given below:

Cryogenic liquid is passed through the pipe (2) connected with the liquid container (1) into the device. The liquid passes through the tube (5) produces a drag force which makes the hollow cylinder (7) slide horizontally in the direction of flow. The hollow cylinder (7) is fixed with a metal strip (8) hinged at (10) with a metal flat (12). The metal flat (12) is fixed at the bottom of the metal frame (14), to make the system rigid, the metal frame (14) is welded with the tube (6). During the movement of rectangular cylinder (7) due to drag force of the liquid in the right hand direction, the opposite end of the metal strip (8) will move towards the left hand direction on the hinge (10). The lower portion of the metal strip (8) is provided with a coil (11) while the bottom end of the metal strip (8) is in contact with a potentiometer wire forming two arms of a whetstone bridge. The potentiometer wire (13) is mounted on two insulators (17) which is based on the frame (14). At no flow condition the metal strip (8) would make contact with the middle of the wire (13) which would send a very small positive voltage to the microprocessor unit (20) which however would respond only when unbalance voltage exceeds this value. The other parts of the whetstone bridge circuit (21) is placed outside the casing (15) & (16). The movement of contact with whetstone bridge circuit (13) will unbalance the bridge, output of which is fed to a microprocessor unit (20). The microprocessor unit (20) will now produce a DSc current proportional to the bridge (13) output and fed to the coil (19) and coil (11). Both the coils (19, 11) are connected with a thin slack wire (18) so that the same current flows through both the coils but in opposite directions. The slack wire (18) does not produce hindrance to the movement of the coil (11) with the respect of coil (19). The coil (19) is fixed with the metal frame (14) but insulated from it by an insulator (22), while coil (11) can move with the metal strip (8). The current in the coils (19, 11) will produce repulsive force which will move the metal strip (8) back till a balance position is attained reducing, the bridge (13) output below a prefixed small value, under which condition the microprocessor unit (20) will stop further increase in value of current supplied to the coil. The value of this current is calibrated against the flow rate of cryogenic liquid through the device and displayed in a liquid crystal display panel. Any change in the flow rate of liquid will produce corresponding change in drag force on the hollow cylinder (7) and the microprocessor unit (20) will effect change in the current flowing through the coils (19, 11) to keep the metal strip (8) in the central position.

The main advantages of the device of the present invention are:
1. Precise measurement of flow of inert cryogenic liquid at any time is assured by this invention.
2. Avoids rough estimation of flow of $LN_G$ from a tanker at a particular time, thus enabling the user to make proper plan for flushing $LN_G$ through bore hole to control fire in underground mine.
3. Helps in optimising $LN_2$ flushing through bore holes, thus combating of fire is possible in minimum time.
4. This device is the most economical device to construct.
5. Since the sensing element is such that its average density is same as that of liquid whose flow is to be measured, the device need not be kept in horizontal position.
6. The present device can also be used for measurement of flow rate of any other non-conducting liquid.
7. The system does not introduce any resistance to the flow of liquid being measured.

What is claimed is:
1. A device for measuring flow rate of cryogenic liquid flowing through a tube, comprising a first tube and a second tube placed co-axially to form a co-axial tube and having an air-free space between the two tubes;

said co-axial tube having both ends closed;

said air-free space being filled with an insulating material;

the co-axial tube being provided with a segmental opening with sealed ends to accommodate a close-ended hollow cylinder having its upper surface profile matching with that of the first tube;

a conducting strip having one end thereof connected to a bottom surface of the hollow cylinder, and the other end being in contact with a stretched potentiometer wire to form a junction of two arms of a Wheatstone bridge;

the conducting strip being rotatably fixed by a hinge, a support and a fixed frame whereby the upper surface of the hollow cylinder is flush with an inner wall of the first tube and allows lateral movement of the hollow cylinder due to drag force of cryogenic liquid flow;

the two ends of the conducting strip being insulated from each other by an insulating block;

the conducting strip being provided with a first co-axial coil between the hinge and the potentiometer wire contact end;

one end of the first coil being connected through a slackening wire to one end of a second co-axial coil fixed on to the frame through an insulating block;

the frame having two insulators fixed onto it supporting the stretched potentiometer wire;

the frame, the conducting strip, the potentiometer wire and the coils being enclosed in a dual walled, jacketed, and insulated casting so that two ends of the potentiometer wire, a portion of the conducting strip between the insulator and the contact end and free ends of the co-axial coils are electrically connected to the Wheatstone bridge and a microprocessor unit.

2. A device as claimed in claim 1, wherein the overall density of the set-up consisting of the hollow cylinder, the conducting strip and the attached coaxial coils is the same as the density of the cryogenic liquid, flow rate of which is to be measured.

3. A device as claimed in claim 1, wherein current flowing through the two coaxial coils is in opposite direction.

4. A device as claimed in claim 1, wherein the microprocessor unit has an Analogue to Digital Converter port, a Digital to Analogue Converter port, a plurality of memory locations, and a display unit interface.

5. A device as claimed in claim 1, which is capable of measuring flow rate without hindering or offering additional resistance to flow of the cryogenic liquid.

6. A device as claimed in claim 1, wherein the coaxial tubes are closed at both ends by plug means.

7. A device as claimed in claim 1, wherein the conducting strip is hinged at its middle portion.

8. A device as claimed in claim 1, wherein the segmently opening is provided at the bottom portion of the co-axial tube.

* * * * *